United States Patent [19]

Stvan et al.

[11] 4,125,678

[45] Nov. 14, 1978

[54] RADIATION POLYMERIZABLE COMPOSITIONS

[75] Inventors: Otto J. Stvan, Frankfort; Mary G. Brodie, Chicago, both of Ill.

[73] Assignee: The Sherwin-Williams Company, Cleveland, Ohio

[21] Appl. No.: 750,999

[22] Filed: Dec. 15, 1976

Related U.S. Application Data

[63] Continuation of Ser. No. 395,302, Sep. 7, 1973, abandoned.

[51] Int. Cl.$^2$ ............................ C08F 2/54; C08F 2/50
[52] U.S. Cl. ............................ 428/514; 204/159.15; 204/159.23; 260/23 AR; 260/21; 427/44; 427/54; 428/522; 526/258
[58] Field of Search ............... 204/159.15, 159.23; 428/514, 522; 427/44, 54

[56] References Cited

U.S. PATENT DOCUMENTS

| | | | |
|---|---|---|---|
| 3,461,093 | 8/1969 | Walton et al. | 260/21 |
| 3,733,287 | 5/1973 | Masuda et al. | 260/21 |
| 3,840,448 | 10/1974 | Osborn et al. | 204/159.14 |
| 3,899,611 | 8/1975 | Hall | 204/159.16 X |
| 3,935,330 | 1/1976 | Smith et al. | 204/159.15 X |

*Primary Examiner*—Walter C. Danison
*Attorney, Agent, or Firm*—James V. Tura

[57] ABSTRACT

This invention relates to radiation polymerizable compositions particularly useful in the preparation of printing inks and to a method of preparing said radiation polymerizable compositions which comprises (1) a condensation product with (2) up to about 90% by weight thereof of at least one ethylenically unsaturated monomer and (3) up to about 50% by weight thereof of at least one sensitizer. The condensation products are prepared by condensing at least one alkoxy-methyl aminotriazine or methylol aminotriazine with one or more polyols, e.g. raw castor oil and at least one hydroxyalkyl acrylate. The polymerizable composition may be cured with radiation, e.g. light or electrons to obtain coatings useful for a variety of purposes.

40 Claims, No Drawings

RADIATION POLYMERIZABLE COMPOSITIONS

This application is a continuation of co-pending application, Ser. No. 395,302, filed on Sept. 7, 1973, now abandoned.

This invention relates to polymerizable compositions and more specifically to radiation polymerizable compositions which can be cured to hard, flexible films useful for a variety of purposes. More specifically, this invention is directed to a radiation polymerizable composition which comprises (a) a major amount of a condensation product, (b) an effective amount, if desired, of an ethylenically unsaturated monomer and (c) a minor but effective amount, if any, of at least one sensitizer. The condensation products are prepared by condensing at temperatures of at least about 25° C., one or more alkoxy-alkyl amino-triazines or methylol amino-triazine, i.e. methylol melamine, at least one polyol, e.g. raw castor oil and at least one hydroxy-alkyl acrylate. The condensation reaction takes place under conventional reaction conditions in the presence of an acid catalyst at temperatures ranging up to about 150° C.

In accordance with this invention, the condensation products which are derived from one or more of the amino-triazines, polyols and hydroxy-alkyl acrylates are capable of being cured or polymerized by radiation, e.g. light or electrons, etc. in a comparatively short amount of time. Curing of these condensation products is essentially by a free-radical polymerization or by the addition of the acrylic residues and, if desirable, by the addition of other ethylenically unsaturated monomers, e.g. alkyl acrylates to form homopolymers or copolymers. The radiation polymerizable compositions may be used either alone or with other known additives such as pigments and colorants, for a variety of purposes including inks, decorative coatings, binders for fabrics, protective films, adhesives, etc. The polymeric compositions are substantially alkaline and acid resistant, resistant to solvents, highly durable or abrasion resistant, hard, flexible, etc. These characteristics, however, will vary depending upon the relative amounts and different monomers used in preparing the composition.

Accordingly, it is an object of this invention to provide a radiation polymerizable composition which may be used for the preparation of inks. It is another object of this invention to provide a radiation polymerizable composition which can be completely cured without releasing volatile materials during the polymerization. It is another object of this invention to provide a polymerizable composition which can be applied to a substrate and cured, in situ, by exposure to radiation to obtain hard and flexible coatings. It is still a further object of this invention to provide a coated surface derived from a radiation polymerizable composition which is resistant to surface abrasion and has good flexibility. It is still a further object of this invention to provide a polymerizable composition for coating various substrates including, metal, wood, paper, plastic, etc. It is still a further object to provide a polymerizable composition which has a fast rate of cure and, therefore, may be used for preparing coatings of various thicknesses. These and other objects will become apparent from a further and more detailed description of the invention as follows.

Specifically, the radiation polymerizable compositions of this invention, i.e. cured by exposure to radiation of light, electrons or some other high-energy source consist essentially of (a) a condensation product, (b) from 0 to about 90% by weight of said condensation product of at least one ethylenically unsaturated monomer, e.g. butyl acrylate, etc. and (c) from 0 to about 50% by weight of said condensation product of at least one sensitizer, e.g. a photosensitizer. These polymerizable compositions may be completely cured by the addition of the monomers through the double bonds, i.e. the unsaturation of the acrylic residues of the condensation product and if desired with the addition of an ethylenically unsaturated compound.

The condensation product which may be subsequently homo or copolymerized are obtained by co-reacting under condensation reaction conditions, e.g. at temperatures of at least about 25° C. and in the presence of up to 5% by weight of an acid catalyst, from about 1.0 to 80% by weight of the total reactants of at least one polyol, about 4 to 70% by weight of the total reactants of at least one hydroxy-alkyl acrylate and from about 10 to 81% by weight of the total reactants of at least one amino-triazine having the formula:

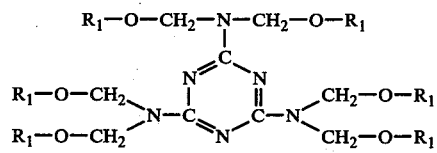

where $R_1$ is either the same or different and is either an alkyl radical of 1 to 4 carbon atoms or a hydrogen atom.

The curing mechanism involves the homopolymerization or copolymerization, when an ethylenically unsaturated comonomer is present, of the double bonds of the acrylic residue of the condensation product. If the polymerizable compositions are to be photopolymerized, the presence of a photosensitizer is needed to increase the photosensitivity of the condensation product, i.e. derived from the condensation of the amino-triazine with the hydroxy-alkyl acrylate and polyol. These photosensitizers absorb light and through various mechanisms generate free-radical catalyst which initiates the addition polymerization.

More specifically, the condensation reaction products are obtained, for example, by condensing under known reaction conditions in the presence of effective amounts of an acid catalyst and at temperatures ranging up to about 150° C., at least one alkoxyalkyl aminotriazine or methylol amino-triazine, e.g. methoxymethyl amino-triazine or hexamethylol melamine wherein the alkoxy group has 1 to 4 carbon atoms with at least one hydroxy-alkyl acrylate, e.g. a mono- or polyhydroxy-alkyl acrylate and at least one polyhydroxy compound or polyol having at least two reactive hydroxy groups per molecule, e.g. raw castor oil. At these temperatures, for example, and depending on the starting materials, the hydroxy-alkyl acrylate and polyhydroxy compound go through a transetherification reaction with the alkoxy-alkyl or methylol amino-triazine to split off alcohol and/or water. This reaction results in a condensation product having residues of both the acrylate and the polyhydroxy compound which may be illustrated by the following formula:

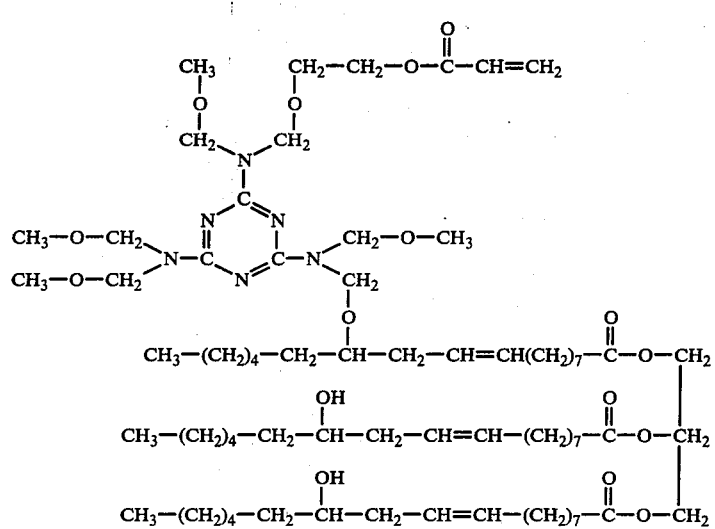

Condensation Product of Methoxy Methyl Amino-Triazine/
Hydroxy Ethyl Acrylate/Raw Castor Oil The condensation products of this invention are derived directly from one or more methylol or alkoxyalkyl, i.e. methyl derivative of amino-triazines having the formula:

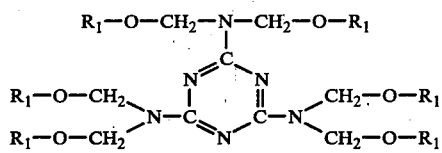

wherein the $R_1$'s are either the same or different alkyl groups of 1 to 4 carbon atoms or hydrogen atoms. The alkoxy-methyl derivatives of the amino-triazines may be prepared by known methods which comprises, for example, reacting any methylolated triazine (obtained from melamine and formaldehyde) with a lower molecular weight aliphatic monohydroxy alcohol, e.g. $C_1$ to $C_4$ alcohols. While the higher molecular weight alcohol derivatives of the amino-triazine may be prepared, they are not preferred because they are more difficult to condense due to their higher boiling points, and at temperatures in excess of about 150° C. there is a tendency for the reaction product to gel.

Moreover, since the alkylating group, e.g. the alcohol residue is lost during the transetherification reaction, it is generally preferred to use a lower molecular weight alcohol such as methanol not only because it is comparatively cheap, but also because it is readily removed from the condensation reaction. Thus, for purposes of this invention, the alkoxy-methyl melamines or amino-triazines are derived from $C_1$ to $C_4$ alcohols, i.e. methyl, ethyl, propyl or butyl alcohol. The particularly preferred amino-triazines are the $C_1$ and $C_2$ alkoxy-methyl amino-triazines, such as hexakis (methoxy methyl or ethoxy methyl melamine).

The condensation reaction products are obtained by condensing the alkoxy-methyl amino-triazines or methylol amino-triazine with a polyol and at least one hydroxy-alkyl acrylate, e.g. a mono- or polyhydroxy-alkyl mono- or polyacrylate or alkacrylate having the formula $CH_2=CR_2-COOR_3$ wherein $R_2$ is either hydrogen, a halogen, an alkyl or substituted alkyl, e.g. halogen-substituted alkyl group of 1 to 2 carbon atoms and $R_3$ is a mono- or polyhydroxy alkyl or substituted alkyl, e.g. halogen-substituted hydroxy alkyl group of 1 to 6 or 1 to 4 carbon atoms.

For purposes of this invention, the term "hydroxyalkyl acrylate" includes not only the mono- and polyacrylates or mono- and polyalkacrylates, such as the mono- and polyhydroxy-alkyl di- and tri- acrylates or alkacrylates, e.g. the methacrylates, but also the halogen-substituted, e.g. the chlorine or bromine-substituted mono- or polyhydroxy alkyl acrylates, such as the mono- or polyhydroxy alkyl chloroacrylate or hydroxy chloroalkyl acrylates or methacrylates, etc.

The hydroxy-alkyl acrylates are present, as one of the coreactants in the condensation reaction, in amounts ranging from about 4 to 70% by weight of the total amount of reactants and more preferably in amounts ranging from about 15 to 50% by weight of the total amount of the reactants. These acrylates may be described as esters of acrylic or substituted acrylic acid such as 2-hydroxy-propyl acrylate, 3-hydroxy-butyl acrylate, hydroxy pentyl acrylate, 5-hydroxy-pentyl acrylate, hydroxy-hexyl acrylate, 2-hydroxy-butyl acrylate, 2-hydroxy-ethyl methacrylate, 2-hydroxy ethyl chloroacrylate, 2-hydroxy-ethyl acrylate, 2-hydroxy-ethyl ethacrylate, 3-hydroxy-propyl methacrylate, 3-hydroxy-propyl chloroacrylate, 4-hydroxy-butyl methacrylate, 3-hydroxy-butyl ethacrylate, 3-hydroxy-propyl ethacrylate, 3-hydroxy-butyl chloroacrylate, 3-hydroxy-propyl acrylate, 3-hydroxy-propyl chloroacrylate, 4-hydroxy-butyl acrylate, 2-hydroxy-ethyl chloroacrylate, 3-hydroxy butyl chloroethacrylate, 5-hydroxy-pentyl acrylate, 2-hydroxy-propyl chloromethacrylate, 5-hydroxy-pentyl methacrylate, 6-hydroxy hexylacrylate, 2-hydroxy-butyl chloromethacrylate, 2-hydroxy-ethyl chloroethacrylate, 3-hydroxy-butyl methacrylate, 2-hydroxy-ethyl chloromethacrylate, 2-hydroxy-propyl chloroethacrylate, 2-hydroxy butyl dichloroethacrylate, 3-hydroxy-propyl chloromethacrylate, 3-hydroxy-propyl chloroethacrylate, 3-hydroxy-butyl bromomethacrylate, 2-hydroxy-butyl chloromethacrylate, 4-hydroxy-butyl 2-chloroethacrylate, 3-hydroxy-propyl 2-bromoethacrylate, 4-hydroxy-butyl 2-bromoethacrylate, hydroxy-hexyl methacrylate, and various other vinyl or acrylic reactants which contain at least one free alcoholic hydroxyl group, e.g. a mono- or polyhydroxyalkyl ester of acrylic, methacrylic or ethacrylic acid.

Specific acrylic esters that may be used include, for example, polyethylene glycol methacrylate, diethylene glycol methacrylate, triethylene glycol methacrylate, tetraethylene glycol methacrylate, dipropylene glycol methacrylate, tetraethylene glycol chloroacrylate, tetraethylene glycol acrylate, tetraethylene glycol dichloroacrylate, glycerol methacrylate, pentaerythritol methacrylate, etc.

Other hydroxy-containing acrylates include diethylene glycol monoacrylate, triethylene glycol monoacrylate, dipropylene glycol monoacrylate, trimethylol ethane diacrylate, trimethylol propane diacrylate, pentaerythritol triacrylate, glycerol diacrylate, pentaerythritol monoacrylate, glycerol monoacrylate, trimethylol ethane monoacrylate, trimethylol propane monoacrylate, trimethylol ethane chloroacrylate, trimethylol propane diacrylate, trimethylol propane monomethacrylate, ethylene glycol acrylate, pentaerythritol dichloroacrylate, dipentaerythritol acrylate, dipentaerythritol triacrylate, pentaerythritol dimethacrylate, and combinations of these hydroxy-containing acrylates in any proportion.

In addition to the hydroxy-containing acrylates, the alkoxymethyl and/or methyl amino-triazines are condensed also with one or more polyhydroxy compounds, i.e. polyols and preferably with an aliphatic polyol having up to 200 carbon atoms, e.g. 2 to 90 carbon atoms. These polyols are present in the condensation reaction in amounts ranging from about 1.0 to 80% by weight of the total reactants and more preferably in an amount ranging from about 1.0 to 37% by weight of the total amount of reactants. Of the various polyols that may be used in the condensation reaction, the aliphatic alcohols are particularly preferred and include, for example, ethylene glycol, propylene glycol, butylene glycol, diethylene glycol, dipropylene glycol, triethylene glycol, tetraethylene glycol, trimethylol ethane, trimethylol propane, neopentyl glycol, pentaerythritol, dipentaerythritol, glycerol, polyglycerol, aribitol, sorbitol, mannitol and various diols such as 1,6-hexanediol, 2-ethyl 1,3-hexanediol, 2,2,4-trimethyl 1,3-pentanediol, 1,2-propane diol, 1,4-butane diol, 1,5-pentane diol, hexane diol, etc. Other known polyols include the di-, tri- and tetra- methylol hydrocarbons and the polyethers, polyesters and polycaprolactones. Of the different polyols that may be condensed with the amino-triazines, the particularly preferred polyols include the polyhydroxy-containing esters of the mono- and dicarboxylic acids, e.g. the glycerol esters of fatty acids, e.g. the ricinoleic acid esters such as raw castor oil and the like.

Preferably, the transetherification or condensation reaction is conducted in the presence of an inert organic medium and in an oxygen-containing atmosphere, e.g. air, with a catalyst to facilitate the reaction. The inert organic medium may include, for example, any one of the known organic solvents such as methyl ethyl ketone, diisobutyl ketone, diethyl ketone and various esters such as the alkyl esters or one of the aromatic solvents including xylene, toluene, benzene, naphtha or one of the aliphatic hydrocarbons including the alkanes, such as pentane, heptane, octane, etc.

To obtain efficient transetherification, an acid catalyst is needed and may include a variety of acids which have a dissociation constant greater than about $1 \times 10^{-5}$. More specifically, the transetherification reaction takes place at room temperature, but generally at temperatures ranging from about 25° C. to 150° C. and more preferably at temperatures ranging from about 50° C. to 130° C. in the presence of a catalyst under known condensation reaction conditions. These condensation reaction catalysts are well known and include, for example, 0.01 to 5% by weight of the total reactants of one or more acids including the organic or inorganic acids, e.g. phosphoric acid, hydrochloric acid, sulfuric acid, nitric acid and various other low molecular weight organic acids, e.g. formic acid, oxalic acid, propionic acid, acetic acid, maleic acid, fumaric acid and different sulfonic acids, e.g. paratoluene sulfonic acid, etc. These acids may be used in various proportions depending on the strength of the acid but preferably in amounts ranging up to about 5%, e.g. 0.1 to 3% by weight of the total reaction mass. When using a strong acid, e.g. sulfuric or hydrochloric acid, a lower concentration may be employed in comparison to utilizing a weak acid, e.g. acetic acid, where it may be desirable to use larger amounts to obtain complete condensation. During condensation of the hydroxy-alkyl acrylate and polyhydroxy compound with the aminotriazines, alcohol and/or water are displaced and the degree of condensation can be determined by comparing the amounts collected with the theoretical amounts.

Homopolymerization of the condensation product is primarily an addition or free-radical polymerization of the unsaturation of the acrylic residues. Preferably, the substituted amino-triazines which contains residues of both the castor oil and the acrylate are homopolymerized by light in the presence of a sensitizer, e.g. a photosensitizer. If desirable, copolymerized products of the condensation products are obtained by photopolymerizing the condensation product with one or more ethylenically unsaturated monomers in the presence of the sensitizer. Although it is not necessary to have a sensitizer present when the radiation is electrons, a photosensitizer is important for the polymerization of the condensation product when the radiation is light.

Radiation may include, for example, electromagnetic radiation, e.g. gamma rays, x-rays or radiation by alpha particles or beta radiation (electrons) from radioactive isotopes as well as high energy electrons from accelerators. The electron beam, used to effect polymerization, may be obtained from beams of electrons produced by high voltage electron accelerators including, for example, the Van de Graaff electrostatic accelerator, resonant transformers, transformer rectifiers, microwave wave guide linear accelerators, betatrons, synchrotrons, etc. The electron beam of these generators ordinarily have energy exceeding the 100,000 electron volts. The dosage of irradiation is measured in terms of the quantity of energy absorbed by the composition being irradiated. In radiation dosimetry, the megarad is defined as a dose of radiation producing an energy absorption of 100,000,000 egrs per gram of material being irradiated. In order to obtain polymerization of the compositions of this invention by using high energy raidation, the electron dosage level should be within the range of about 0.1 megarad to about 10 megarads. The exact dosage, however, will vary depending upon the thickness and the density as well as the particular composition being cured.

When light is used as a source of radiation, it is important to have present with the condensation product, (e.g. the transetherification product of the amino-triazine, castor oil and hydroxy acrylate) at least one photosensitizer in amounts ranging up to about 50% by weight and preferably in amounts ranging from 0.01 to 30% or 2.0 to 15% by weight of the condensation product. The source of light, e.g. generally ultra-violet light of 1800 to 4000 A° may range from 1800 to 5000 A° which has an intensity of at least 0.003 watts per cm². An exposure ranging up to 120 seconds, e.g. 30 to 90 seconds, generally is sufficient to effect polymerization. Sources of light include the low pressure mercury vapor quartz discharge tubes and high pressure mercury vapor quartz discharge tubes. For example, when the polymerizable composition containing a photosensitizer and the condensation product is irradiated with wave lengths below about 4500 A°, the period of irradiation should range from about 1 to 10 seconds at a position of approximately 0.5 to 12 inches from the surface being irradiated or cured.

The photosensitizers may include the acryloins and various derivatives thereof including benzoin methyl ether, benzoin ethyl ether, the halogenated-aliphatic, alicyclic or aromatic hydrocarbons wherein the halogen atoms are directly attached to the ring structure and the various ketones, such as acetone, acetophenone, benzophenone, isobutyl ether of benzoin, and many other known photosensitive compositions which have a triplet energy ranging from about 42 to 85 cal per mole. Some of these sensitizers are disclosed on page 132 of *Molecular Photochemistry* by N. J. Turro, published by W. A. Benjamin, Inc. (1967). In addition, other photosensitizers or photochemically active catalysts may be found in the prior art including U.S. Pat. Nos. 3,326,710; 2,951,758; 2,809,183; 2,754,210; 2,579,095; 2,548,685 and 2,505,068; the disclosures of which are included herein by reference.

Although the condensation reaction product (e.g. derived from the amino-triazine, hydroxy acrylate and castor oil) can be polymerized with either light or electrons, it may be desirable in some instances to utilize a comonomer particularly when it is desirable to control the viscosity of the composition. The comonomers, i.e. ethylenically unsaturated monomers which copolymerize with the condensation product are characterized as having at least one unsaturated group, i.e.

or $CH_2=CH-$ and may be used in amounts ranging from about 0 to 90% by weight and preferably in amounts ranging from about 5 to 50% by weight of the condensation product. These ethylenically unsaturated monomers may be used either alone or in combination, in any proportion, and include, for example, various unsaturated monomeric compounds such as vinyl toluene, styrene and particularly the acrylates, e.g. the mono- and polyacrylates such as butyl acrylate or other higher molecular weight acrylates including, for example, pentaerythritol triacrylate, neopentyl glycol diacrylate, etc. In addition, some of the other derivatives of acrylic or an alkacrylic acid may be used and these may include the amides, nitriles or methylolated acrylamides, e.g. methylolated diacetone acrylamides, etc. Other comonomers include the vinyl ethers, allyl cyanurates, triallyl isocyanurates, allyl phthalates, vinyl esters, e.g. the vinyl esters of aliphatic carboxylic acids such as vinyl acetate and vinyl esters of other acids such as propionic acid, isobutyric acid, capric acid and the unsaturated acids such as oleic acid.

Thus, ethylenic unsaturated monomeric compounds which copolymerizes with the unsaturation of the condensation-reaction product when exposed to radiation, e.g. electron beam or light may be used in various proportions depending upon the ultimate characteristic desired in the product. The characteristics of a coated surface derived from the polymerizable compositions will vary, depending upon the particular monomers and the relative proportion of the monomer with respect to acid and alkaline resistance, adhesion, abrasion resistance, hardness, flexibility, etc.

The following examples illustrate the polymerizable compositions and method of preparing same in accordance with this invention.

EXAMPLE I

| Reactants | Percent by Weight |
|---|---|
| Hexakis (Methoxy Methyl Amino-Triazine) | 41.1 |
| 2-hydroxy ethyl acrylate | 37.9 |
| Raw castor oil | 21.0 |
| Oxalic acid | 0.1 |
| Hydroquinone | 0.2 |
| Toluene | 2.7 |

The amino-triazine, hydroxy ethyl acrylate and raw castor oil together with the oxalic acid and hydroquinone were charged into a reaction flask fitted with a reflux condenser. Dry air was bubbled through while stirring was maintained. The temperature of the reaction mixture was held at about 225° F. with reflux of alcohol, i.e. methanol beginning at about 200° F. The methanol was removed from the reaction at temperatures of about 225° F. until the desired viscosity was obtained. Toluene was added to the reaction mass and the temperature was maintained at about 230° F. The temperature of the reaction was increased to about 250° F. while blowing with air with some toluene and alcohol being stripped from the reaction mixture. When the proper viscosity was obtained, the mixture was cooled and the product was removed from the reactor. The product was characterized as a resin having 96 to 98% non-volatile material with a small amount of unreacted hydroxy-ethyl acrylate.

The use of inhibitors, e.g. up to about 1% by weight of the reaction mixture such as hydroquinone in the presence of air keeps the acrylic functionality from prematurely polymerizing during the transetherification reaction. Moreover, the presence of the inhibitor maintains the resin in a stable condition until it is ready to be used. Thus, one or more of these inhibitors may be used to prevent partial or premature polymerization.

Other specific examples prepared by the process of Example I are set forth in Table I. The use of a polyol, e.g. raw castor oil to improve the product is illustrated by the data in Table II.

TABLE I

| Examples | Components | Type Cook | NVM |
|---|---|---|---|
| 1 | X745[1]/2-HEA[8]/RCO[9] wt.% 64.0/19.7/16/3 | Straight cook (No solvent) | 90.2 |
| 2 | Cymel 303/2-HEA/RCO wt.% 69.6/21.4/9.0 | " | 97.6 |
| 3 | Cymel 303/2-HEA/RCO wt.% 41.1/37.9/21.0 | " | 89.4 |
| 4 | Cymel 303/2-HEA/RCO wt.% 38.6/31.6/28.6 | " | 88.4 |
| 5 | Cymel 303/2-HEA/RCO wt.% 53.5/32.8/13.7 | " | 91.4 |

TABLE I-continued

| Examples | Components | Type Cook | NVM |
|---|---|---|---|
| 6 | Cymel 303/2-HEA/TP4040[2] wt.% 35.1/28.6/36.3 | Toluene | 91.3 |
| 7 | Cymel 303/2-HEA/P2010[4] wt.% 42.8/35.0/22.2 | " | 93.2 |
| 8 | Cymel 303/2-HEA/P1010[2] wt.% 48.3/39.4/12.3 | " | 92.8 |
| 9 | Cymel 303/2-HEA/PPG1025[3] wt.% 53.5/32.8/13.7 | Straight cook | 94.8 |
| 10 | Cymel 303/2-HEA/PPG3025[3] wt.% 42.1/25.6/24.1 | " | 96.2 |
| 11 | Cymel 303/2-HEA/PPG2025[3] wt.% 47.0/28.9/24.1 | Toluene | 98.8 |
| 12 | Cymel 300/2-HEA/PCP0210[4] wt.% 54.7/33.7/11.6 | Straight cook | 92 |
| 13 | Cymel 300/2-HEA/PCP0240[4] wt.% 47.0/28.9/24.1 | " | 92.5 |
| 14 | Cymel 300/2-HEA/PCP0300[4] wt.% 57.0135.1/7.9 | " | 95.5 |
| 15 | Cymel 303/2-HEA/(Tall Oil FA/Tris Amino, 1/1 Adduct) 36/29/35 | Toluene | 95.5 |
| 16 | Cymel 303/Acrylamide/RCO wt.% 61.7/22.5/15.8 | Straight cook | 96.3 |
| 17 | Cymel 303/HPA[5]/RCO wt.% 46.6/42.7/10.7 | Toluene | — |
| 18 | Cymel 303/HEA/glycerol wt.% 54.3/44.5/1.2 | — | 97 |
| 18a | HBM$_2$[6]/HEA/RCO 65/25/10 | — | — |

Footnotes:
[1]X745-HM$_3$, Cymel 300,303 are hexakis (methoxy methyl amino-triazine).
[2]TP4040, P2010 and P1010 are polyether polyol.
[3]PPG1025, PPG3025, 2025, 3035 are polyether polyol.
[4]PCP0210, PCP0240, PCP0300, P2010 are polycaprolactone polyol.
[5]HPA is hydroxy propyl acrylate.
[6]HBM$_2$ is hexakis (butoxy methyl amino-triazine).
[7]NVM is percent of non-volatile material.
[8]HEA is hydroxy ethyl acrylate.
[9]RCO is raw castor oil.

TABLE II

Instron Data for HM$_3$[1]/HEA[2] adducts with and without polyol

| Examples | Mol Ratio HM$_3$[1]/HEA[2]/Polyol | Elongation | % |
|---|---|---|---|
| 19 | 1.0/3.0/0.216 | RCO[3] | 6.0 |
| 20 | 1.0/3.0/0.00 | RCO[3] | 1.0 |
| 21 | 1.0/2.66/0.33 | PCP-0300[4] | 10 |
| 22 | 1.0/2.66/0.33 | TP-440[5] | 9.6 |
| 23 | 1.0/2.66/0.33 | LHT-240[6] | 8.0 |
| 24 | 1.0/3.0/0 | — | 0.55 |

Footnotes:
[1]HM$_3$ is hexakis (methoxy methyl amino-triazine).
[2]HEA is hydroxy ethyl acrylate.
[3]RCO is raw castor oil.
[4]PCP-0300 is polycaprolactone (mol. wt. 520).
[5]TP-440 is polyether triol (mol. wt. 400).
[6]LHT-240 is polyether triol (mol. wt. 700).

It is seen from the data in Table II that the adducts obtained with a polyol, e.g. raw castor oil have a substantially improved percent elongation. Where no polyol was used, the polymerizable composition had poor pigment wetting and on curing was too brittle.

The polymerizable compositions of this invention are particularly useful as vehicles in the preparation of printing inks and are generally known as actinic-radiation curable printing inks. While inks cured by actinic radiation are generally known in the art, they have not achieved widespread use because of the difficulties encountered in the curing process. Recently, however, there is more interest in inks cured by radiation, not only because the method of curing avoids the use of solvents and, therefore, virtually eliminates the problem of air pollution, but also because the process requires less energy for cure.

In preparing inks are composition, conventional coloring agents including pigments and dyes are added to the polymerizable composition in effective amounts. The polymerizable composition may be pigmented with various organic or inorganic pigments, including, for example, the molybdates, titanium white, chrome yellow, phthalocyanine blue, carbon black, Rubine red, benzidene yellow, etc. These compositions may be used on a variety of substrates such as glass, plastic, metal, etc.

In addition to printing inks, the polymerizable compositions may be used as coatings on various other substrates or support materials including steel plate, tin plate, aluminum plate, foil, polymeric films, glass, plastic, wood and particularly on substrates which cannot be subjected to the higher temperatures, normally encountered in heat curing, e.g. paper substrates. These coatings are prepared, for example, by applying a film of the polymerizable composition, e.g. of 0.1 to 12 mil. thickness onto a substrate by any method, e.g. spraying, brushing, rolling, etc. and subsequently subjecting said film to radiations of light or electrons.

The following examples illustrated, for purposes of this invention, the use of the polymerizable compositions in combination with a coloring agent as ink compositions.

EXAMPLE A

| Components | Percent by Weight |
|---|---|
| Vehicle (Polymerizable composition of Example 1) | 35% |
| TiO$_2$ pigment | 50% |
| Sensitizer (Isobutyl ether of benzoin) | 15% |

EXAMPLE B

| Components | Percent by Weight |
|---|---|
| Vehicle (Polymerizable composition of Example 1) | 55% |
| Phthalo blue dye | 20% |
| Aluminum hydrate | 10% |
| Sensitizer (Acetophenone) | 15% |

In preparing ink compositions various combinations of colors or dyes in amounts ranging from 1 to 60% by weight of the total compositions may be used and more preferably in amounts ranging from 1 to 30% by weight. In addition to the coloring agents and the sensitizer, the ink compositions may contain minor amounts of other known additives generally used in inks. For example, if desirable, conventional solvents may be used. Other additives which may be used to improve the film characteristics of the printed surface may include, for example, various low melting microcrystalline waxes, polyethylene waxes, silicones, inhibitors e.g. quinones, etc.

While this invention has been described by a number of specific embodiments, it is obvious there are other variations and modifications which can be made without departing from the spirit and scope of the invention as particularly set forth in the appended claims.

What is claimed is:

1. A radiation polymerizable composition consisting essentially of (a) a condensation product (b) 0 to 90% by weight of said condensation product of at least one ethylenically unsaturated monomer and (c) from 0 to 50% by weight of said condensation product of at least one radiation sensitizer; said condensation product obtained by coreacting about 1.0 to 80% by weight of at least one polyol, 4 to 70% by weight of at least one hydroxy-alkyl acrylate wherein the alkyl radical has from 1 to 6 carbon atoms and from about 10 to 81% by weight of at least one amino-triazine having the formula:

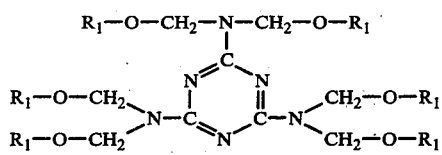

wherein $R_1$ is either the same or different and is an alkyl radical of 1 to 4 carbon atoms or hydrogen.

2. The radiation polymerizable composition of claim 1 further characterized in that the hydroxy-alkyl acrylate is a mono- or polyhdroxy alkyl mono- or polyacrylate.

3. The radiation polymerizable composition of claim 1 further characterized in that the hydroxy-alkyl acrylate is a mono- or polyhydroxy halogen-substituted alkyl acrylate.

4. The radiation polymerizable composition of claim 1 further characterized in that the polyol is raw castor oil, the hydroxy-alkyl acrylate is a monohydroxy-alkyl acrylate or monohydroxy-alkyl methacrylate and the amino-triazine has the formula wherein $R_1$ is an alkyl radical of 1 to 4 carbon atoms.

5. The radiation polymerizable composition of claim 1 further characterized in that the polyol is raw castor oil, the hydroxy-alkyl acrylate is a monohydroxy-alkyl monoacrylate or monohydroxy-alkyl polymethacrylate and the amino-triazine has the formula wherein $R_1$ is hydrogen.

6. A radiation polymerizable composition consisting essentially of (a) a condensation product, (b) from 0 to 90% by weight of said condensation product of at least one ethylenically unsaturated monomer and (c) from 0 to 50% by weight of said condensation product of at least one radiation sensitizer; said condensation product obtained by coreacting about 1.0 to 80% by weight of at least one aliphatic polyol,
4 to 70% by weight of at least one hydroxy-alkyl acrylate having the formula

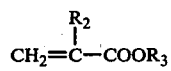

wherein $R_2$ is either hydrogen, halogen or an alkyl group of 1 to 2 carbon atoms and $R_3$ is a hydroxy-alkyl radical having 1 to 6 carbon atoms and from about 10 to 81% by weight of at least one amino-triazine having the formula:

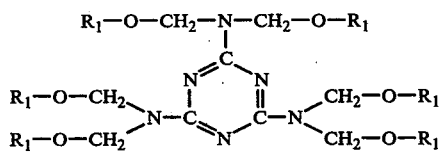

wherein $R_1$ is either the same or different and is alkyl radical of 1 to 4 carbon atoms or hydrogen.

7. The radiation polymerizable composition of claim 6 further characterized in that said composition is polymerized by the radiation of light or electrons.

8. The radiation polymerizable composition of claim 6 further characterized in that the sensitizer is present in an amount ranging from about 0.01 to 30% by weight of the condensation product.

9. The radiation polymerizable composition of claim 8 further characterized in that said composition is polymerized by the radiation of light.

10. The radiation polymerizable composition of claim 7 further characterized in that said composition is polymerized by the radiation of electrons.

11. The radiation polymerizable composition of claim 6 further characterized in that the polyol is raw castor oil, the hydroxy-alkyl acrylate has the formula wherein $R_3$ has 1 to 4 carbon atoms and the amino-triazine has the formula wherein $R_1$ is hydrogen.

12. The radiation polymerizable composition of claim 11 further characterized in that the sensitizer ranges from approximately 0.01 to 30% by weight of the condensation product.

13. A process for polymerizing a composition with radiation which comprises preparing a mixture consisting essentially of (a) a condensation product, (b) from 0 to 90% by weight of said condensation product of at least one ethylenically unsaturated monomer and (c) 0 to 50% by weight of said condensation product of at least one sensitizer and subsequently polymerizing said mixture with radiations of light or electrons until cured; said condensation product prepared by coreacting at temperatures of at least about 25° C. in the presence of an acid catalyst approximately 1.0 to 80% by weight of at least one polyol
4 to 70% by weight of at least one hydroxy-alkyl acrylate having the formula

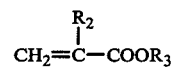

wherein $R_2$ is either hydrogen, halogen or an alkyl group of 1 to 2 carbon atoms and $R_3$ is a hydroxy-alkyl radical having 1 to 6 carbon atoms, 10 to 81% by weight of at least one amino-triazine having the formula:

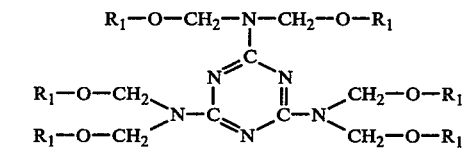

wherein the $R_1$ is either the same or different and is an alkyl radical of 1 to 4 carbon atoms or hydrogen.

14. The process of claim 13 further characterized in that the condensation product is prepared in the presence of an organic acid catalyst at temperatures ranging from about 25° C. to 150° C.

15. The process of claim 13 further characterized in that the sensitizer ranges from about 0.01 to 30% by weight of the condensation product.

16. The process of claim 15 further characterized in that the composition is polymerized with radiation of light.

17. The process of claim 13 further characterized in that the composition is polymerized with the radiation of electrons.

18. A process for preparing a polymeric coating on a substrate which comprises
(a) preparing a condensation product by coreacting at temperatures of at least about 25° C. approximately
1.0 to 80% by weight of at least one polyol,
4 to 70% by weight of at least one hydroxy-alkyl acrylate having the formula

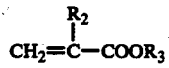

wherein $R_2$ is either hydrogen, halogen or an alkyl group of 1 to 2 carbon atoms and $R_3$ is a hydroxy-alkyl radical having 1 to 6 carbon atoms.
10 to 81% by weight of at least one amino-triazine having the formula:

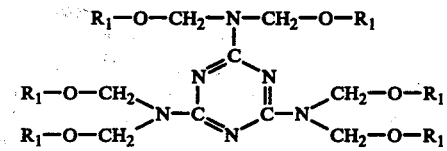

wherein R is either the same or different and is an alkyl radical of 1 to 4 carbon atoms or hydrogen,
(b) preparing a mixture consisting essentially of said condensation product and 0 to 90% by weight thereof of at least one ethylenically unsaturated monomer and 0 to 50% by weight thereof of at least one sensitizer and subsequently
(c) coating said mixture onto a substrate and polymerizing the coating with the radiation of light or electrons until cured.

19. The process of claim 18 further characterized in that the polyol is raw caster oil, the acrylate is a hydroxy-alkyl acrylate of the formula wherein $R_3$ has 1 to 4 carbon atoms, the amino-triazine has the formula wherein $R_1$ has 1 to 4 carbon atoms and the ethylenically unsaturated monomer is an alkyl acrylate.

20. The process of claim 19 further characterized in that the sensitizer ranges from about 0.01 to 30% by weight of the condensation product.

21. The process of claim 20 further characterized in that the coating on the substrate is polymerized with radiation of light.

22. The process of claim 18 further characterized in that the coating on the substrate is polymerized with radiation of electrons.

23. A photopolymerizable composition consisting essentially of (a) a condensation product (b) 0 to 90% by weight of said condensation product of at least one ethylenically unsaturated monomer and (c) about 0.01 to 30% by weight of said condensation product of at least one photosensitizer; said condensation product obtained by coreacting approximately
1.0 to 37% by weight of at least one aliphatic polyol,
15 to 50% by weight of at least one hydroxy-alkyl acrylate or hydroxy-alkyl methacrylate wherein the alkyl radical has 1 to 6 carbon atoms; and
35 to 70% by weight of at least one amino-triazine having the formula

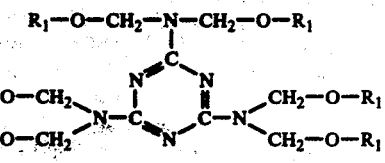

wherein $R_1$ is either the same or different and is an alkyl radical of 1 to 4 carbon atoms or hydrogen.

24. The photopolymerizable composition of claim 23 further characterized in that said composition is photopolymerized by light of wave lengths ranging from about 1500 to 5000 amgstroms.

25. The photopolymerizable composition of claim 24 further characterized in that the light is ultra-violet light.

26. The photopolymerizable composition of claim 23 further characterized in that the polyol is raw castor oil.

27. The composition of claim 26 further characterized in that the photosensitizer is benzophenone.

28. The composition of claim 23 further characterized in that the composition contains an effective amount of a quinone inhibitor.

29. A process for preparing a photopolymerized coating on a substrate which comprises
(a) preparing a condensation product by coreacting at temperatures of at least about 25° C. approximately
1.0 to 37% by weight of at least one polyol,
15 to 50% by weight of at least one hydroxy-alkyl acrylate or hydroxy-alkyl methacrylate, wherein the alkyl radical has 1 to 6 carbon atoms and
35 to 70% by weight of at least one amino-triazine having the formula

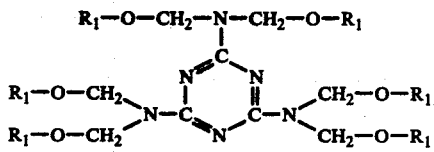

wherein $R_1$ is either the same or different and is an alkyl radical of 1 to 4 carbon atoms or hydrogen,
(b) preparing a mixture consisting essentially of said condensation product and 0 to 90% by weight thereof of at least one ethylenically unsaturated monomer and from about 0.01 to 30% by weight of said condensation product of at least one photosensitizer, and subsequently
(c) coating said mixture onto a substrate and photopolymerizing said coating with light until cured.

30. The process of claim 29 further characterized in that $R_1$ is a methyl radical.

31. The process of claim 29 further characterized in that the condensation product is prepared by coreacting at temperatures of at least about 75° C. in the presence of an acid catalyst.

32. The process of claim 29 further characterized in that the acrylate is 2-hydroxy-ethyl acrylate and the polyol is raw castor oil.

33. A process for curing a photopolymerizable composition which comprises preparing a mixture consisting essentially of (a) a condensation product, (b) about 0 to 90% by weight of said condensation product of at least one ethylenically unsaturated monomer and (c) about 0.01 to 30% by weight of said condensation product of at least one photosensitizer and subsequently photopolymerizing said mixture with light until cured; said condensation product obtained by coreacting at temperatures of at least about 25° C. in the presence of an acid catalyst approximately
  1.0 to 37% by weight of at least one polyol,
  15 to 50% by weight of at least one hydroxy-alkyl acrylate or hydroxy-alkyl methacrylate wherein the alkyl radical has 1 to 6 carbon atoms, and
  35 to 70% by weight of at least one amino-triazine having the formula

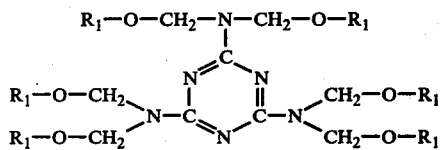

wherein $R_1$ is either the same or different and is an alkyl radical of 1 to 4 carbon atoms or hydrogen.

34. The process of claim 33 further characterized in that the condensation reaction takes place in the presence of an organic acid catalyst at temperatures ranging from about 25° C. to 150° C.

35. The process of claim 33 further characterized in that the condensation product is mixed with about 2.0 to 15% by weight of at least one photosensitizer, 5 to 50% by weight of an alkyl acrylate monomer, and coated onto the substrate to form a film of about 0.1 to 12 mil thickness and subsequently photopolymerized with ultra-violet light.

36. A polymeric coated substrate obtained by the process of claim 29.

37. The polymeric coated substrate of claim 36 further characterized in that the substrate is wood.

38. A radiation-curable ink composition consisting essentially of (a) a condensation product (b) 0 to 90% by weight of said condensation product of at least one ethylenically unsaturated monomer, (c) 0 to 50% by weight of said condensation product of at least one photosensitizer and (d) an effective amount of a colorant; said condensation product obtained by coreacting about
  1.0 to 80% by weight of at least one aliphatic polyol,
  4 to 70% by weight of at least one hydroxy-alkyl acrylate or hydroxy-alkyl methacrylate wherein the alkyl radical has from 1 to 6 carbon atoms and
  10 to 81% by weight of at least one amino-triazine having the formula

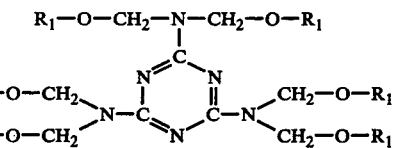

wherein $R_1$ is either the same or different and is an alkyl radical of 1 to 4 carbon atoms or hydrogen.

39. The ink composition of claim 38 further characterized in that the composition contains 0.01 to 30% by weight of the photosensitizer and is curable with the radiation of light.

40. The ink composition of claim 38 further characterized in that the composition is curable with the radiation of electrons.

* * * * *